US009725956B2

(12) United States Patent
Adelsbach

(10) Patent No.: US 9,725,956 B2
(45) Date of Patent: Aug. 8, 2017

(54) DRILL RIG AND METHODS OF MANUFACTURE AND USE OF SAME

(71) Applicant: Scott Adelsbach, Glen Ellyn, IL (US)

(72) Inventor: Scott Adelsbach, Glen Ellyn, IL (US)

(*) Notice: Subject to any disclaimer, the term of this patent is extended or adjusted under 35 U.S.C. 154(b) by 456 days.

(21) Appl. No.: 14/217,400

(22) Filed: Mar. 17, 2014

(65) Prior Publication Data

US 2015/0000890 A1 Jan. 1, 2015

Related U.S. Application Data

(60) Provisional application No. 61/802,053, filed on Mar. 15, 2013.

(51) Int. Cl.
*E21B 7/02* (2006.01)
*F03G 7/04* (2006.01)
*B60S 9/02* (2006.01)

(52) U.S. Cl.
CPC ............... *E21B 7/02* (2013.01); *E21B 7/024* (2013.01); *F03G 7/04* (2013.01); *B60S 9/02* (2013.01); *Y02E 10/10* (2013.01)

(58) Field of Classification Search
CPC ..... E21B 7/02; E21B 7/024; F03G 7/04; B60S 9/02; Y02E 10/10
USPC ............................. 166/57; 175/57; 280/766.1
See application file for complete search history.

(56) References Cited

U.S. PATENT DOCUMENTS

| 5,248,005 A | * | 9/1993 | Mochizuki | .............. E21B 7/023 166/901 |
| 2003/0111266 A1 | * | 6/2003 | Roach | .................. B23Q 9/0078 175/57 |

FOREIGN PATENT DOCUMENTS

WO    WO 2010005522 A1 * 1/2010 ............ E21B 7/027

* cited by examiner

*Primary Examiner* — Taras P Bemko
(74) *Attorney, Agent, or Firm* — Mark A. Hamill

(57) ABSTRACT

The present invention provides an improved drill rig for drilling vertical loop field for geothermal heating/air conditioning units, methods of designing and installing novel vertical loop fields under existing buildings, and novel vertical loop field structures and geothermal heating systems including such loop fields.

14 Claims, 8 Drawing Sheets

DRILL RIG AND METHODS OF MANUFACTURE AND USE OF SAME

FIELD OF THE INVENTION

The present invention is directed to a novel drill rig for use in installation of loop fields for geothermal heating and air-conditioning systems as well as methods of manufacturing such rigs and using them to bore novel geothermal loop fields. More particularly, the invention is directed to a novel drill rig that can be used to efficiently drill novel, high efficiency, geothermal loop fields as well as drill holes for soil toxin mitigation in existing buildings.

BACKGROUND OF THE INVENTION

Geothermal heating and air-conditioning units have the advantage over conventional forced air and boiler units of utilizing the near constant temperature of the earth as a heating/cooling sink. This is usually done by the circulation of a thermally conducting fluid, typically water mixed with propylene glycol, ethylene glycol, methanol or similar antifreezing compound, through a sealed geothermal loop field buried deep underground. In the northern tier of the United States, it is often necessary for the thermally conducting fluid to include as much as 25% by volume of an antifreezing compound to prevent the formation of damaging ice crystals in the fluid. After having passed through the ground, the cooled or warmed thermally conducting fluid is then passed through a heat exchanger, which extracts heat from the fluid or passes unwanted heat from the interior of the building to the fluid (depending upon whether the unit is in its heating or cooling mode). After passing through the heat exchanger, the heated or cooled thermal conducting fluid is again pumped back into the ground where it can once again extract heat or dissipate heat (again, depending upon heating or cooling) into the earth. Such geothermal heating and air-conditioning units provide improved energy efficiency relative to traditional forced air heating systems. This efficiency advantage can, in some cases, generate a 30% decrease in energy expenditures compared to traditional forced air heating and air-conditioning systems.

In order to install geothermal heating and air-conditioning systems, a geothermal loop field comprised of a series of connected, thermally conductive pipes is typically installed in the earth to contain the thermally conducting fluid. The prior art vertical geothermal loop fields were typically installed into a very deep, spaced apart boreholes drilled into the ground near the building to be heated and/or cooled. For a three thousand square foot residence, prior art systems typically required between about 2 and about 4 boreholes, (depending on the region) spaced at least 15 feet apart. As a general rule of thumb, prior art geothermal heating/cooling systems typically included at least 300 lineal feet of geothermal vertical borehole depth (vertical loop depth) for every 1000 square feet of living space in the residence. Commercial geothermal systems are typically much larger and required a significantly larger number of boreholes. One inefficiency created by the prior art loop fields was that the set up process for the drill rig for each new borehole was more labor intensive and time consuming than is desirable. Such processes typically involve a crew of two to three workers and usually required about ninety minutes of their time. Further prior art loop field drill rigs were often not usable when the temperature dropped below freezing since the drilling recirculation fluid often freezes at such temperatures.

In order to minimize the number of time consuming drill rig breakdown and set up processes for a given prior art loop field, typically each field was designed with the minimum number of deep boreholes that would provide the required number of lineal feet of vertical loop necessary for the building. For this reason, most residential loop fields utilize boreholes that are drilled between about 300 to about 600 vertical feet into the ground. In order to create the deep boreholes for the prior art loop field, large drill rigs weighing from about 7 to 25 tons were typically used and were either towed between the spaced apart borehole positions by large trucks or the drill rig itself was integrated into a heavy duty drill rig truck. Each of the boreholes of a typical prior art geothermal loop field descend through an average of about 100 feet of overburden (soil and other relatively loose material above the bedrock horizon) and usually through at least about 200 feet of bedrock. The depth of overburden above bedrock at a particular location can vary considerably and varies significantly between different portions of the same county, state, etc. Since boring the typical residential four-inch borehole through bedrock requires at least about 4000 pounds of down pressure at the drill bit, the large heavy drill rigs of the prior art were deemed necessary to provide such down pressures and to provide sufficient power to lift and drive into the hole the pipe necessary to drill boreholes. The deep, prior art vertical boreholes are typically joined together by number of horizontal pipe runs that are routed to a manifold located on the exterior of the structure to be heated and/or cooled. From this exterior, buried manifold, the thermally conducting fluid is piped to interior of the structure to the condenser unit. Installation of the horizontal pipe runs and manifold requires a significant amount of trenching and backfilling to bury the horizontal pipe runs and manifold underground. Another problem is that such horizontal pipe runs needed to be buried in deep trenches that were below the local frost line. Further, installation of prior art vertical loop fields typically required drilling through the exterior wall (typically made of concrete) of the building foundation to allow the pipes entering and exiting the manifold to access the building interior. These trenching, backfilling, and building foundation drilling processes add significant cost to the construction of a prior art geothermal loop field. The buried manifolds of the prior art systems are difficult to purge, and if not purged correctly, negatively affect the efficiency of the system. Further, periodic maintenance and servicing of the geothermal system will sometimes require access to the buried manifold so it may have to be dug up on occasion, which can be inconvenient for the property owner.

The applicant has discovered that the deeply bored prior art geothermal loop fields are less efficient in operation and more costly to construct than is desirable. For example, during the latter portions of the winter in the northern tier of the continental United States, the applicant has found that prior art geothermal loop fields frequently return thermal fluid to the condenser that was only a few degrees above freezing or in some case several degrees below 32° F. During periods of such near freezing thermal fluid return, the efficiency of the geothermal unit for heating was significantly degraded. As a general rule of thumb, the warmer the return fluid during the heating season, the more BTU's per hour the system can produce. In part, this is because at such low fluid return temperatures, the thermal conducting fluid becomes sufficiently viscous that it causes the system's pump to use excessive amounts of energy to keep the fluid circulating. Furthermore, the large drill rig equipment required for drilling prior art geothermal field loops was often too large to maneuver into place for drilling in small, closely spaced lots, particularly, urban residential lots. Urban residential lots often have garages, utility poles, trees and encroaching buildings on adjacent lots that leave only a very small pathway to access any open space within the lot that is appropriate for drilling boreholes. For this reason, such lots were often too congested to allow prior art drill rigs to reach the interior of the lot for drilling a sufficient number of boreholes to provide enough heating/cooling capacity to meet the needs of the building owner. Due to this situation, owners of smaller lots, including many small lot urban homeowners, have been dissuaded from even considering geothermal heating and air-conditioning solutions by their builders or remodeling contractors.

OBJECTS OF THE INVENTION

It is one object of the invention to provide a novel drill rig that can be used to the install a novel, highly efficient geothermal loop field within the confines of small, restricted access lots.

It is another object of the invention to provide a method of drilling novel, highly efficient geothermal loop fields that deliver higher heating/cooling efficiency per lineal foot drilled than conventional loop fields.

It is still another object of the invention to provide novel, highly efficient geothermal loop fields.

It is further object of the invention to reduce or eliminate the amount of out-of-doors trenching and backfilling to bury horizontal pipe runs required for constructing prior art geothermal loop field.

It is another object of the invention to provide novel vertical loop fields that avoid current and potential future obstacles often found in many lots, e.g., decks, pools, driveways, buried utility lines, future room additions, new utility line trenching or future utility line maintenance, etc.

It is still further object of the invention to provide systems and methods for constructing geothermal loop fields located substantially underneath the structure to be heated/cooled.

It is still another object of the invention to provide a novel geo-thermal loop field that can be constructed for a lower cost per BTU of heating/cooling than prior art fields.

In still another object of the invention, a novel drill rig is provided that can be utilized safely within a small enclosed area without danger of asphyxiation from exhaust fumes.

It is another object of the invention to provide a method of constructing novel, geothermal loop fields that, during the winter months, consistently return significantly warmer thermal conducting fluid to the condenser than prior art geothermal loop fields.

It is another object of the invention to provide a lightweight, highly portable and maneuverable geothermal loop field drill rig that can be maneuvered into tight spaces in existing structures.

It is another object of the invention to provide a lightweight, highly portable and maneuverable geothermal loop field drill rig that provides sufficient down force to efficiently drill through both overburden and bedrock.

It is still another object of the invention to provide a more efficient drill, water recycling system for use with a thermal loop field drill rig.

It is still further object invention to provide urban, small lot homeowners with cost-effective and efficient geothermal heating and air-conditioning system options.

It is yet another object of the invention to provide a serially connected shallow borehole geothermal loop field located entirely in overburden material.

It is another object of the invention to provide deep borehole geothermal loop fields drilled substantially entirely underneath commercial buildings.

It is another object of the invention to provide a novel geothermal loop field installation method which can allow for drilling the vertical loop field boreholes when the out-of-doors temperatures are below freezing or during other periods of inclement weather.

It is another object of the invention to provide a compact, lightweight, highly portable drill rig for use in the soil toxin mitigation processes for existing buildings.

It is a still further object of the invention to provide a lightweight portable, modular drill rig that can be broken down into at least two components to ease the entry into and the exit from an existing buildings.

It is a still further object of the invention to provide a lightweight portable, modular drill rig that has a detachable torque hub member so the rig can be optimized for either high speed drilling through softer materials and lower speed, higher torque drilling through harder (e.g., granite bedrock) or more challenging (e.g., hard pan overburden) below ground environments.

SUMMARY OF THE INVENTION

In one aspect of the invention, a lightweight, portable drill rig for use in constructing a geothermal loop field is provided, which includes: a lightweight frame, a drilling member attached to the frame for drilling boreholes for the geothermal loop field, a remote power source located apart from the drilling member and operably coupled to the drill member to rotate the drill member, and a selectively activated down force member attached to the frame. When selectively activated, the down force member provides a significant increase in rig down force to the drilling member to cause efficient penetration of the drilling member into the ground during drilling operations. When selectively deactivated, the down force on the drilling rig significantly decreased to allow efficient transport of the rig. In one alternate embodiment of the invention, the selectively activated down force member are extendable foot pads which, when activated, are cranked downward so that an upper portion of the frame engages a portion of a building located above the drill rig, and when deactivated, the foot pads retract into the drill rig thereby lowering the frame and breaking contact with the portion of the building. In another alternate embodiment of the invention, the selectively activated down force member is a rack located on the frame for holding a plurality of field loop drill pipe segments which, when selectively activated, holds a sufficiently large number of field loop piping segments to provide the necessary down force to the drill member for a given job and also allows for easy storage and quick pipe change out. When put into the selectively deactivated condition, the field loop pipe segments can be removed from the rack thereby substantially reducing the down force on the drill rig to allow efficient transport of the drill rig. In still another alternate embodiment of the invention, the selectively down force members may include a plurality of concrete fastener that are tightened down into a concrete slab located under the rig with the head of the concrete fastener pressing down forcefully against the top surface of the footpads of the rig. The frame preferably includes at least two wheels which are located on one end of the frame and spaced less than about four feet apart, and preferably about two feet apart, thereby allowing a substantial portion of the weight of the drill rig to be supported by the at least two wheels so that the rig may be wheeled up/down a standard sized staircase into the basement of a building for drilling therein and for removal after drilling by the same route. Preferably, the drill rig of the invention is sufficiently lightweight and compact that it can also be transferred through building windows, and is also preferably has removable portions so the machine can be split into pieces and reassembled for very small access areas. In one preferred embodiment of the invention, the weight of the drill rig is less than 1000 pounds with the selectively activated down force member deactivated yet can provide a down force equivalent to about a 4000 pound drill rig through selective activation of the selectively activated down force member. Preferably, in another aspect of the invention, a stationary drill water recycling system is operably coupled to the drill rig to allow for drilling of multiple boreholes while leaving the water recycling filtration elements in the same position.

In another aspect of the invention, a lightweight, portable drill rig for use for drilling geothermal loop field boreholes underneath a building into which a geothermal heating/air conditioning unit is being installed, the drill rig includes: a lightweight frame, a drilling member attached to the frame for drilling boreholes for the geothermal loop field, a hydraulic pressure motor located outside of the building, and a hydraulic fluid conduit in fluid communication with the hydraulic pressure motor to deliver pressurized hydraulic fluid to the drill member to drive rotation of the drill member. Preferably, the hydraulic pressure motor is a small internal combustion engine which is located out-of-doors so that exhaust fumes are vented away from the enclosed space in which the drill rig is being used. Alternately, the hydraulic pressure motor may be electrically powered if a readily accessible source of electricity is available at the loop field construction site. In another alternate embodiment of the invention, a first end of the drill rig frame includes a pair of spaced apart wheels and a pair of selectively descending footpads, which can be extended downwardly prior to initiation of the drilling operation. Still further, the second end of the drill rig frame includes a second pair of wheels and a second pair of selectively descending footpads extending from the bottom of the frame. In this alternate embodiment, the frame may also be equipped with a pair of peripheral wheels, which extend outwardly from the upper portion of the frame of either the first and/or second end of the frame. Each of the footpads further includes at least one aperture for receipt of one or more anti-rotation stake members that can be driven into the ground 130 to prevent rotation and/or excessive movement of the frame during a drilling operation. After completion of drilling operation, the anti-rotation stake(s) are removed from the ground 130, the foot pads are retracted into their rig transportation position, and the drill rig is then tilted back onto one pair of the first and second wheel pairs and the pair of upper peripheral wheels in order to roll the drill rig out of the building. During the boring operation, when transporting the rig between one position and the next bore, the four foot pads are retracted, so that the rig can be rolled on the four bottom wheels to next borehole location. Preferably, the lightweight, portable drill rig for use for drilling geothermal loop field boreholes underneath a building also includes: a selectively activated down force member operably linked to the frame, when selectively activated the down force member provides a significant increase in rig down force to cause efficient penetration of the drilling member into the ground 130 during drilling operations. When selectively deactivated, the down force on the drilling rig significantly decreased to allow efficient introduction and removal of the rig from within the building and to allow efficient movement between boreholes at a given loop field installation site. Preferably, the drill rig of the invention also includes a detachable mast unit so that the rig can be broken into lighter weight units for transporting in and out of building and also so different mast units can be substituted into a rig to optimize drilling for different loop field ground conditions. A torque converter or torque hub can be utilized for more efficient drilling of hard bedrock or particularly dense or challenging overburden material. Such a torque hub is preferably permanently mounted to at least one detachable mast unit dimensioned for use with a particular type of drill rig. Other detachable mast units dimension for attachment to the same rig may have different torque hubs or lack any torque hub so that substituting detachable mast units is one way to can optimize the torque capabilities of the drill rig for local ground conditions.

In another aspect of the invention, a highly efficient shallow, serial borehole geothermal loop field is provided, which includes: a plurality of shallow boreholes drilled into the earth, each of the plurality of boreholes descends between about fifty and about one hundred fifty feet below the surface; a thermal conduction fluid inlet in fluid communication with a geothermal heating/air conditioning conduction fluid output; a plurality of descending vertical sealed pipe segments in each of the plurality of boreholes, each of the plurality of descending vertical sealed pipe segments in fluid communication with the thermal conduction fluid inlet; a plurality of ascending vertical sealed pipe segments in fluid communication with a corresponding descending vertical sealant pipe segment located within each borehole; and a thermal conduction fluid outlet in fluid communication with each of the descending vertical sealed pipe segments, the thermal conduction fluid outlet being in fluid communication with thermal conduction fluid intake of geothermal heating/air conditioning unit. Surprisingly, applicant has found that the shallow, serial vertical borehole geothermal loop fields of the invention can return significantly higher temperature thermal conducting fluid than the deep, vertical borehole loop fields of the prior art of the same number of vertical loop lineal footage during the latter parts the winter in the northern tier of states in the continental United States. In contrast to the about 32° F. thermal conducting fluid return temperature frequently found in many prior art deep, geothermal vertical loop field systems under these late season climatic conditions, the applicant has been able to construct loop fields in accordance with the invention, which consistently return thermal conducting fluid at temperatures of above 44° F., and, when the field is installed under a conditioned structure, as high as 48° F. This greatly improves the efficiency of the geothermal heating unit during the winter months and leads to significantly reduced energy costs to the building owner. Preferably, each of the boreholes in the shallow serial geothermal loop fields of the invention is dimensioned so that it passes substantially through only the local overburden material above the local bedrock horizon. Since the overburden is significantly easier to drill through than bedrock, the geothermal loop fields of this embodiment of the invention can be installed significantly more rapidly than a deep field drilled into bedrock of comparable total lineal vertical loop field (borehole) depth. This increased installation efficiency also provides a significant cost savings for the installation process.

In accordance with one alternate embodiment of the geothermal loop field of the invention, the distance between the furthest peripheral borehole locations within the geothermal field is selected to fit within the interior wall foot print of an existing building or building under construction into which a thermal heating/cooling unit is being installed. By utilizing a compact portable drill rig that is sufficiently portable to enter into the basement (or crawl space) of an existing building or into framed out new construction, applicant has been able to install geothermal loop fields underneath structures in small, restricted access urban lots. This allows for cost effective installation of energy-saving geothermal heating/cooling units in lots which may not have been accessible to the larger truck mounted (or towed) drill rigs of the prior art. Furthermore, relatively shallow, connected set of boreholes allow for faster, more efficient drilling per unit BTU than with prior art deep borehole fields. Surprisingly, applicant has found that such shallow, vertical borehole geothermal loop fields of the invention provide significantly more efficient thermal conducting fluid return temperatures (higher return temps in the winter heating season, lower return temps in the summer cooling season) than the prior art loop fields of the same lineal feet of vertical borehole drilled. The loop field of the invention includes an interior mounted manifold that is accessible to the loop field system installer, as well as system maintenance and service personnel after installation. The under structure loop field of the invention eliminate several time consuming steps in the loop field installation and maintenance process including (a) the process of drilling holes in the building foundation (typically made of cement) to allow the supply and return pipes to enter and exit the building, (b) deep horizontal trenching below frost line depths for remote exterior boreholes, (c) digging a hole to encompass the external manifold, (d) back filling over the trenching to remote boreholes and of the buried manifold, (e) marking the location of the manifold on the surface for future access, and (f) digging up the manifold for system maintenance, trouble shooting, or repair. A further advantage of the under building loop field of the invention over the prior art exterior loop fields is that such prior art fields were occasionally dug under a parking lot or driveway. In which case, all removed material for the horizontal trenches would need to be removed from site and compacting gravel would be brought in for backfilling the trenches. The gravel, concrete and asphalt over such loop fields also transfers colder temperatures from the outside air deeper into the ground within the horizontal trenches, which negatively affects the loop field efficiency.

In another aspect of the invention, novel methods of installing vertical geothermal loop fields having at least one pair of shallow depth serially linked vertical boreholes is provided, including the steps of: (a) calculating the number of lineal feet of vertical borehole needed to be drilled to provide a predetermined BTU capacity for the field; (c) calculating the number of shallow depth boreholes necessary to meet the BTU capacity requirement; (d) drilling each of the calculated number of shallow depth boreholes to depth of between about 50 and about 150 feet, (c) installing the descending and ascending pipe segments into each of the shallow depth boreholes; (d) installing at least one output side horizontal pipe to at least one ascending pipe segment in the shallow depths boreholes; (d) installing horizontal serial pipe connecting segments between at least one ascending pipe segment of at least one borehole and the descending segment of a second borehole to join them into a series; (e) installing at least one horizontal return pipe segment between the at least one descending pipe segment of a second borehole of the series; (f) connecting the at least one output side horizontal pipe segment to the output side of the geothermal heating/air conditioning unit; and (g) connecting the at least one input side horizontal pipe segments to the input side of the geothermal heating/air-conditioning unit. In one preferred embodiment of the method of the invention, the input and out horizontal pipe segments are connected to a manifold, and the manifold is connected to the input side and output side of the geothermal heating/air-conditioning unit by a main input pipe, and a main output pipe, respectively. In an alternate method of the invention, the following additional steps are included: calculating the maximum drillable surface area footprint of the lowest floor of a building, planning the arrangement of the calculated number of shallow depth boreholes to fit within the surface area footprint of the building, and drilling each of the calculated number of shallow depth, boreholes within the surface area foot print of the lowest floor of the building.

In another aspect of the invention, a highly efficient vertical geothermal loop field for heating/cooling a building is provided, which includes: a plurality of deep vertical boreholes drilled into the earth, each of the plurality of vertical boreholes being drilled within the predetermined footprint and descending at least one hundred fifty feet below the surface; a thermal conduction fluid inlet in fluid communication with a geothermal heating/air conditioning conduction fluid output; a plurality of descending vertical sealed pipe segments in each of the plurality of boreholes, each of the plurality of descending vertical sealed pipe segments in fluid communication with the thermal conduction fluid inlet; a plurality of ascending vertical sealed pipe segments in fluid communication with a corresponding descending vertical sealant pipe segment located within each borehole; a manifold installed within the predetermined building footprint and being in fluid communication with the plurality of ascending vertical sealed pipe segments and the thermal conduction fluid intake of the geothermal heating/air-conditioning unit; and a thermal conduction fluid outlet in fluid communication with each of the descending vertical sealed pipe segments, the thermal conduction fluid outlet being in fluid communication with thermal conduction fluid intake of geothermal heating/air conditioning unit. The deep borehole, under building vertical geothermal loop fields of this embodiment of the invention are believed to be best suited to multiple-story commercial or industrial buildings.

DETAILED DESCRIPTION

Figure 1:
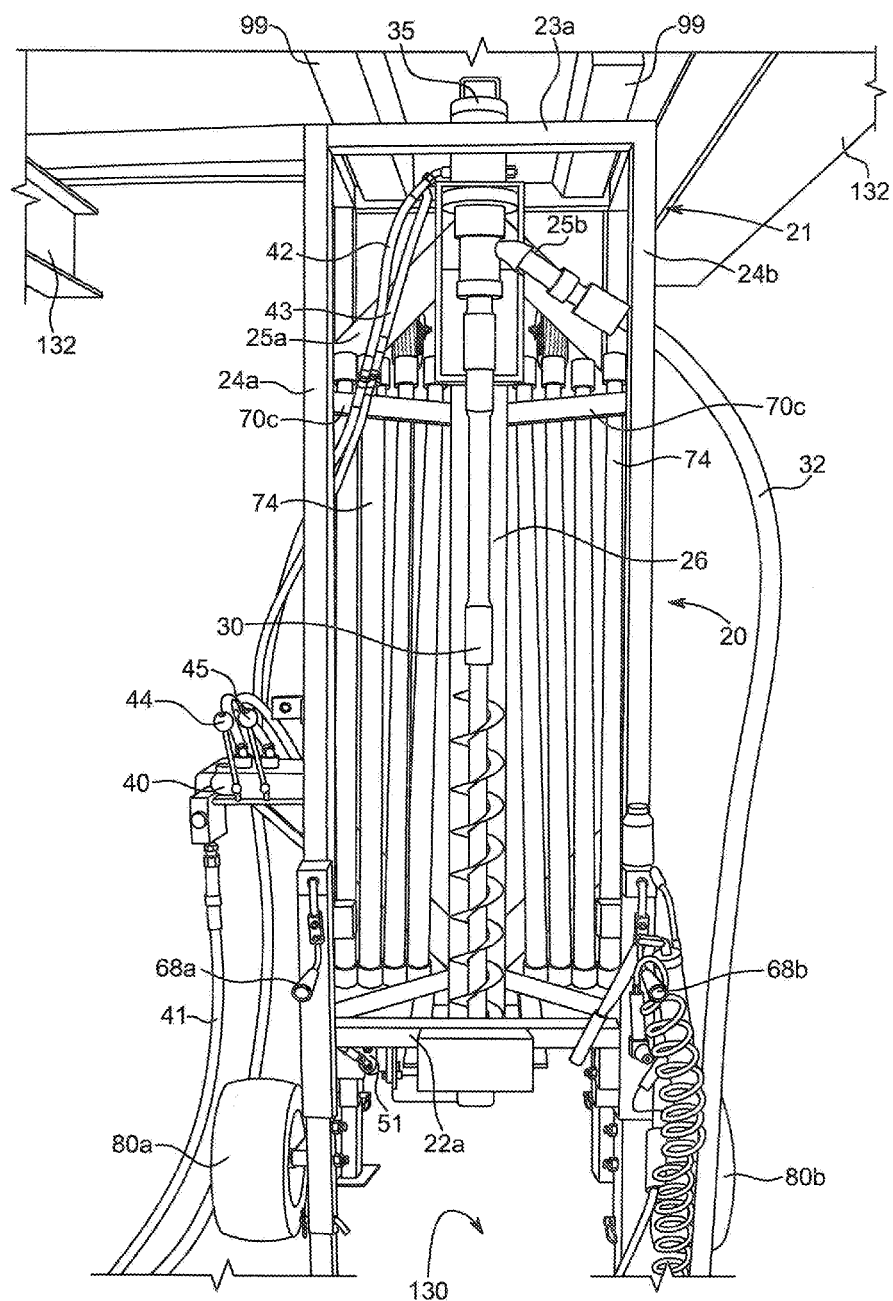
FIG. 1 is a front view of the drill rig in accordance with embodiment of the invention with the drill bit recirculation hose and hydraulic hoses connected to the rig.

FIGS. 1-7 illustrate an embodiment of an improved, lightweight portable drill rig 20 in accordance with the invention. The rig 20 generally includes a frame 21, mast 26, drill bit 30, drill motor 35, hydraulic power control assembly 40, drive chain 50, drive chain motor 51, foot pads 60, pipe racks 70, bottom wheels 80, and peripheral wheels 90. The drill rig of the invention is designed to be lightweight and compact so that it can be maneuvered into basements and crawl spaces of existing buildings (including residential buildings) and down a standard sized building stair cases. The compact, lightweight design of the drill rig 20 allows it to be rolled down a staircase, dropped through a basement window, or lowered in unframed new construction onto the lowest floor of an existing building or new construction in order to drill a vertical loop geothermal loop field underneath such a structure. To enhance its portability and maneuverability, the entire rig 20 preferably weighs less than about 800 pounds and optimally about 600 pounds. Also, since the rig 20 is designed to be wheeled into existing building (or framed out new construction), the rig 20 is relatively narrow. This means that the rig frame 21 is preferably less than four feet in width, and optimally, about two feet in width (excluding the bottom wheels). The preferred dimensions of the rig 20 are height of about 8 feet, a length of about 2 feet, and a width of about 2.5 feet. Another design element that helps to minimize the size and weight of the rig 20 is that the hydraulic pressure engine 45 that powers the rig 20 is remotely located from it. This means that it is preferred that the hydraulic pressure engine 45 is not permanently mounted to the drill rig frame 21. This is best seen in schematic FIG. 7 which shows a hydraulic fluid feed hose 41a and a hydraulic fluid return hose 41b that are connected to an internal combustion hydraulic pressure engine 45 located on the exterior of the building. The hydraulic feed hose 41a and a hydraulic fluid return hose 41b are connected to the rig 20 at the hydraulic control assembly 40. The placement of the hydraulic pressure engine 45 at the exterior of the building also ensures that exhaust fumes are not being generated within the structure in which the drill rig is operating.

Figure 2:
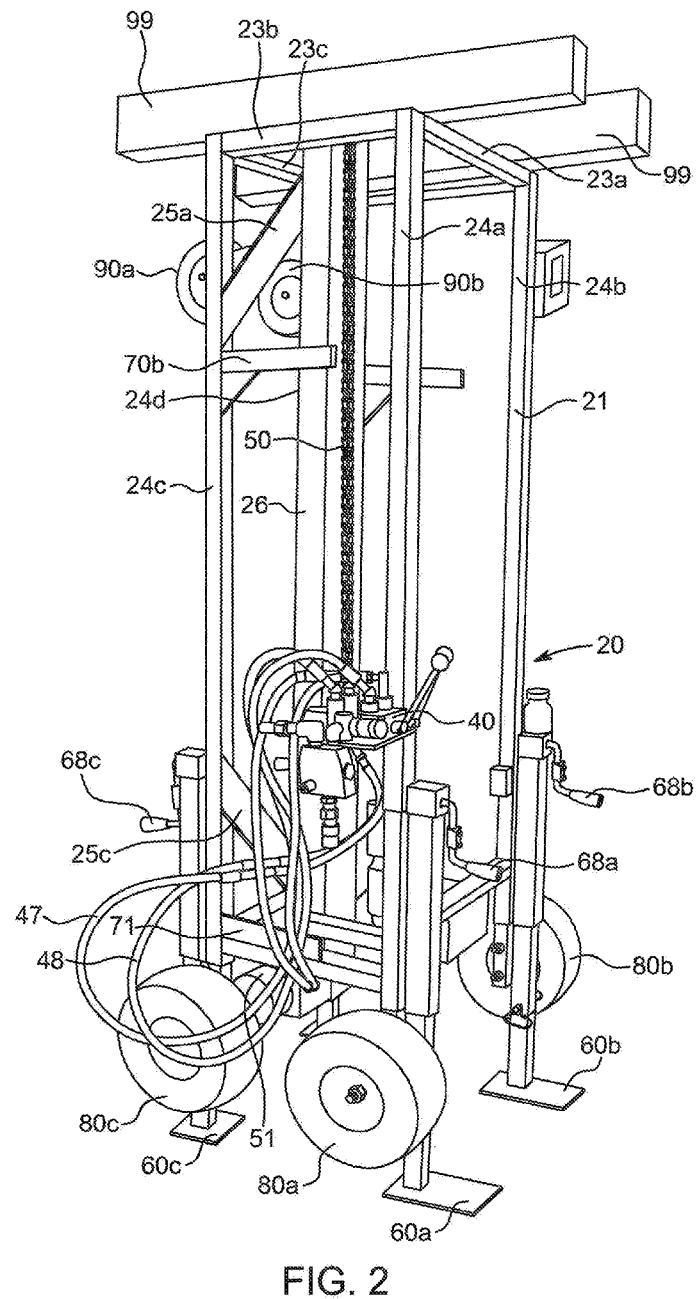
FIG. 2 is side perspective view of the drill rig in accordance with embodiment of FIG. 1 with the drill bit and recirculation hoses removed.

Boring the typical residential four-inch borehole for a geothermal loop field through bedrock requires at least about 4000 pounds of down pressure at the drill bit. Since the lightweight drill rig 20 weights considerably less than 4,000 pounds, it has been designed to provide the option of utilizing the framing 98 of the existing building (or framed out new construction) to provide that down pressure. This is done by means of cranking foot pads 60a-d downwardly via hand cranks 68a-d prior to initiation of the drilling operation. As the foot pads 60a-d descend, the drill rig frame 21 is lifted toward the building framing 98 above the drill rig 20. By this process, the drill rig frame 21 can be wedged up directly against the building framing 98 to apply the necessary down force, or as shown in FIG. 1-2, a pair of spacing members 99 can be placed between the building framing 98 and the drill rig frame 21 to prevent any damage to the framing 98 during the drilling operation. While using the building framing 98 is the preferred method of providing sufficient down pressure to the drill bit 30, the rig 20 may also be used out-of-doors, or in some cases, in a building yet to be framed. In those cases, the down force may be provided by stacking sufficient numbers of pipe segments 74 in the pipe racks 70 to create the required down force or, if the drilling is out or doors, by attaching the hitch 96 located on the back of the rig 20 to a truck (shown in FIG. 6) or to other machinery having sufficient heft.

Returning now in more detail to FIG. 1, drill rig frame 21 is formed from four vertical columns 24a-d at its four corners. The vertical columns 24a-d are joined together by upper cross brace segments 22a-d and lower cross brace segments 23a-d. A mast 26 is joined to the inner surfaces of rear upper cross brace 23a and rear lower cross brace 23d. Angled cross braces 25a-d also help to stabilize the mast 26 by joining it to vertical columns 24c and 24d. Moreover, mast 26 is further stabilized by pipe upper rack segments 70a-c which connect the mast 26 and the rear vertical columns 24c, 24d. The mast 26 is further stabilized by pipe rack trays 71 which connect to the mast 26, rear vertical columns 24c-d, and lower cross braces 23c, 23d. The top end of mast 26 includes an upper sprocket assembly 27a and the bottom end of the mast 26 includes a lower sprocket assembly 27b that both rotatably engage the drive chain 50, which runs along the length of the mast 26.

Figure 3:
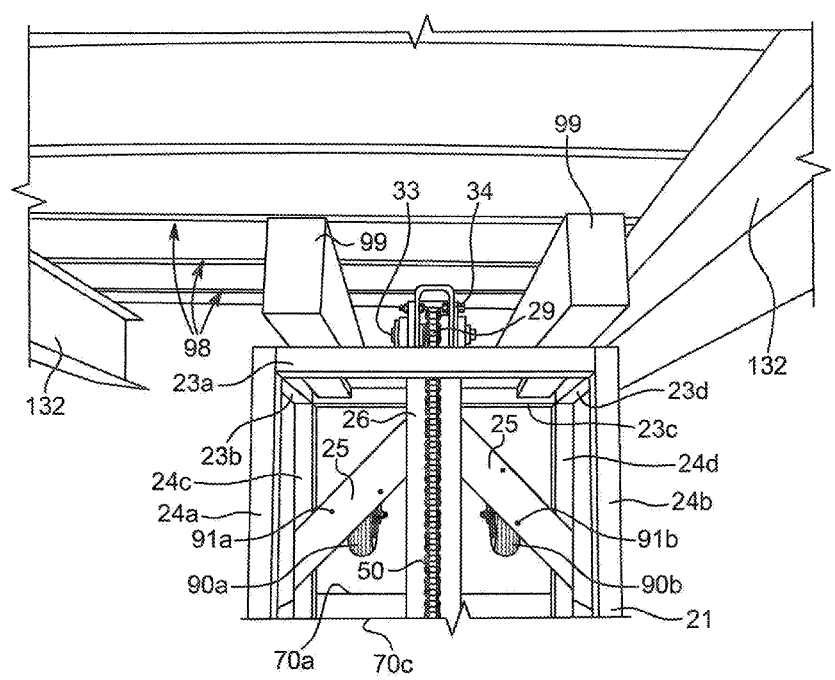
FIG. 3 is front plan view of the top portion of the drill rig of FIG. 1 shown wedged under a building frame.

The drill bit 30 is suspended from an internally threaded bit coupling 31, which in turn descends from drill motor 35. The drill motor 35 is coupled to the drive chain 50 so that drill motor 35, coupling 31 and drill bit 30 can be raised and lowered along the length of the mast 26 by drive chain motor 51. Drill motor 35 includes a hydraulic input port 33, hydraulic output port 34 and recirculation mud port 36. The recirculation mud port 36 is connected to mud recirculation hose 32 which transports recirculated drilling mud to the drill motor 35 and drill bit 30 in order to cool the drill motor 35 and drill bit 30 during drilling operations. The drill hydraulic input port 33 and drill hydraulic output port 34 are connected to drill hydraulic input hose 41 and drill hydraulic output hose 42, respectively. Drill hydraulic input hose 47 and drill hydraulic output hose 42 are in turn connect to the hydraulic control assembly 40, which regulates the flow of hydraulic fluid to the drill motor 35. The flow of hydraulic fluid to both the drill motor 35 and the drive chain motor 51 are regulated at the hydraulic drill control assembly by manipulating drill control lever 44 and drive chain control lever 45, respectively. By manipulating the drill control lever 44, the drill rig operator can activate the drill rig motor 35, control its speed of rotation as well as the direction of rotation. In this way, the operator controls the speed and direction of rotation of the drill bit 30 during a drilling operation. By manipulation of the drive chain control lever 45, the drill rig operator can activate the drive chain motor 51, control its speed, and control the direction in which the chain 50 moves. In this way, the operator controls the speed and direction of the movement of drive chain motor 51 and thereby the travel of the drill bit 30 up-and-down along the length of the mast 26. Referring now to FIG. 3, upper sprocket 29 is mounted to axle 33, which is rotatably mounted in axle frame 34. Drive chain 50 engages and rotates upper sprocket 29 when the chain is driven by the drive chain motor 51. Spacing members 99 are wedged against framing 98, which in the embodiment shown in FIG. 3 are three ceiling joists in the basement of an existing building.

Figure 4:
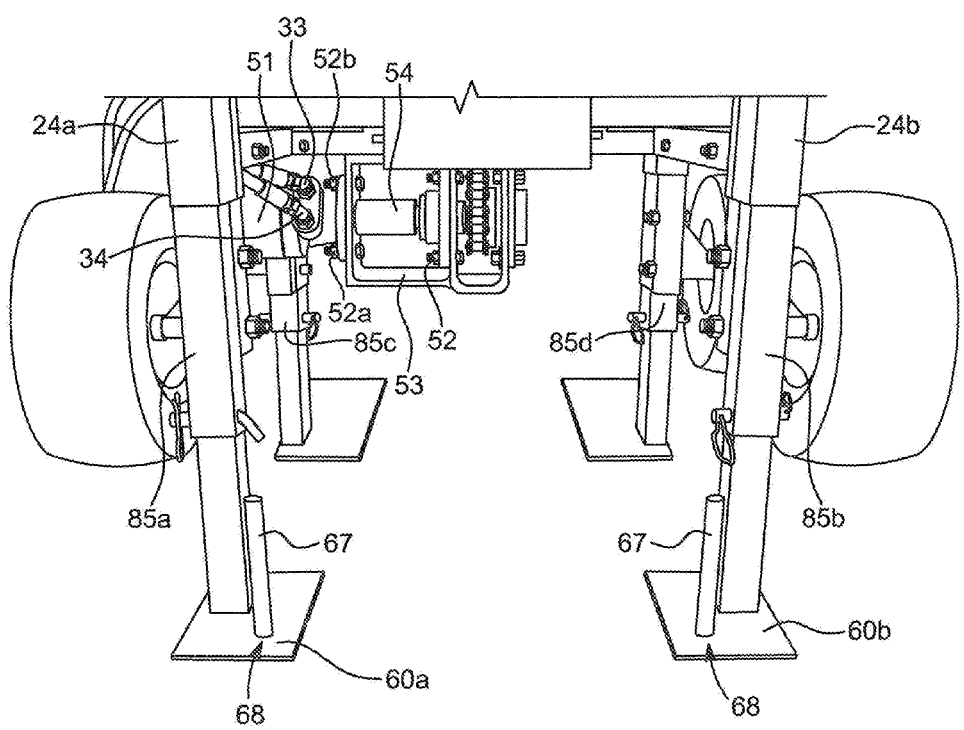
FIG. 4 is a front plan view of the lower portion of the drill rig of FIG. 1 with the foot pads in an extended position.

As shown in FIGS. 1 and 4, the drive chain motor 51 attaches via bolts 52a, 52b to sprocket assembly frame 53. Drive shaft 54 originates in drive chain motor 51 and extend into lower sprocket assembly 27b where it is axially connects to lower sprocket 28. Rotation of the driveshaft 54 by the drive chain motor 51 rotates the lower sprocket 28 and thereby drives the movement of the drive chain 50. Drive chain motor 51 includes drive chain motor hydraulic input port 55 and drive chain motor hydraulic output port 56, which are connected to drive chain motor hydraulic input hose 45 and drive chain motor hydraulic output hose 46, respectively. Drive chain motor hydraulic input hose 45 and drive chain motor hydraulic output hose 46 are in turn connect to the hydraulic control assembly 40, which regulates the flow of hydraulic fluid to the drive chain motor 51.

As best seen in FIGS. 1, 2 and 4, four foot pads 60a-d descend from foot pad frames 61a-d that are mounted to the four vertical columns 24a-d, respectively, of the drill rig frame 21. As can be best seen in FIG. 6, each of the foot pads 60a-d is connected to movable legs 62a-d, which are slidably, telescopically mounted within foot pad frames 61a-d. Each of the movable legs 62a-d include a plurality of dowel holes 63 for receipt of a dowel pin 64 to lock movable legs 62a-d into position once they have been cranked down into an acceptable drilling position for the building in which the vertical loop field is to be drilled. The dowel pins 64 include cotter pins 65 to ensure that the dowel pins are not accidentally dislodged from the dowel holes 64 during a drilling operation. At least two of the foot pads 60a-d include apertures 66 dimensioned to receive anti-rotation stakes 67 which are driven through the apertures 66 and into the ground 130 to prevent rotation of the drill rig 20 during a drilling operation. As best seen in FIG. 2, the upper portion of each the foot pad frames 61a-d include crank handles 68a-d attached to a crank assemblies 69a-d. The crank assemblies 69a-d move the moveable legs 62a-c by activating mechanical gears (not shown) located within the housing of the crank assemblies 69a-d. The use of mechanical crank is preferred to help to minimize the weight and complexity of the rig 20. Alternately, the crank assembly could be coupled to a small hydraulic hand crank motor or could be hydraulically coupled to hydraulic control unit 40 for touch control operation. As explained previously above, about 4000 pounds of down pressure at the drill bit 30 is required to bore the typical residential four-inch vertical borehole through bedrock. With the drill rig 20 of the applicant's invention, the preferred way to provide such down pressure is by moving the drill rig frame 21 up until it is wedged up against the building framing 98 of an existing building (or framed out new construction). The drill rig frame is moved upwardly by means of rotating crank handles 68a-d in their pad descent direction so that movable legs 62a-d are forced downwardly. As the foot pads 60a-d descend, the drill rig frame 21 is lifted toward the building framing 98 above the drill rig 20. Prior to the drill rig frame 21 being wedged against the building framing 98, dowel pins 64 are inserted into dowel holes 63 to retain the legs in a position that requires a limited amount of lift via the hand cranks 68a-d and then cotter pins 65 are inserted into the dowel pins 64 to ensure that the dowel pins do not become accidentally dislodged during the drilling operation. The anti-rotation stakes 67 are inserted through apertures 66 in at least two of the foot pad 60a-d and then they are pounded into the ground 130 to prevent inadvertent rotation of the drill rig 20 during a drilling operation. The stakes are preferably pounded into the ground 130 with a sledgehammer 97, which is preferably stored by insertion into one of tool loops 95 located on the interior of vertical columns 24a, 24b, as seen in FIG. 1. As the drill rig wedging process can cause minor damage to the building framing 98 if concentrated on a single joist, it is preferred that a pair of spacing members 99 are placed between the building framing 98 and the drill rig frame 21 to spread the load amongst multiple joists and to prevent denting or scratching of the building framing 98. After a drilling operation is complete, the drill rig frame 21 is lowered by rotating the crank handle 68a-d in their leg ascent direction so that the drill rig frame 21 is lowered away from the building framing 98 and the anti-rotation stakes 67 are pulled out of the ground 130.

A pair of pipe racks 70 is designed to contain the drill bit extension pipe segments 74 which are sequentially coupled to the drill bit coupling 31 to extend the drill bit 30 further in to the borehole 100a as it becomes progressively deeper. Pipe segments 74 are typically about 5 to 7 feet long and weigh between about 25 and 40 pounds. Each of the pair of pipe racks 70 includes three upper rack segments which form a triangular shaped enclosure to retain the upper ends of the pipe segments 74. The upper pipe rack segments 70a connect to the back surface of mast 26 and to back vertical columns 24c, 24d, respectively. Upper rack segments 70b connect to back vertical columns 24c, 24dc extend toward the front of the drill rig, and attach to upper rack segments 70c. Upper rack segments 70c extend diagonally from its connection to the back surface of the mast 26 toward the front end of the upper rack segments 70b. The upper rack segments 70a-c combined with the mast and back vertical columns to create an enclosure for the top ends of the pipe segments 74. The bottom ends of the pipe segments 74 are retained in the pipe rack trays 71, which are formed from triangular tray base plates 72 and three tray sidewalls 73a-c per pipe rack tray. The pair of pipe rack trays 71 connect to the mast 26, vertical columns 24c-d, and the upper surface of the lower cross braces 23c, 23d.

Figure 5:
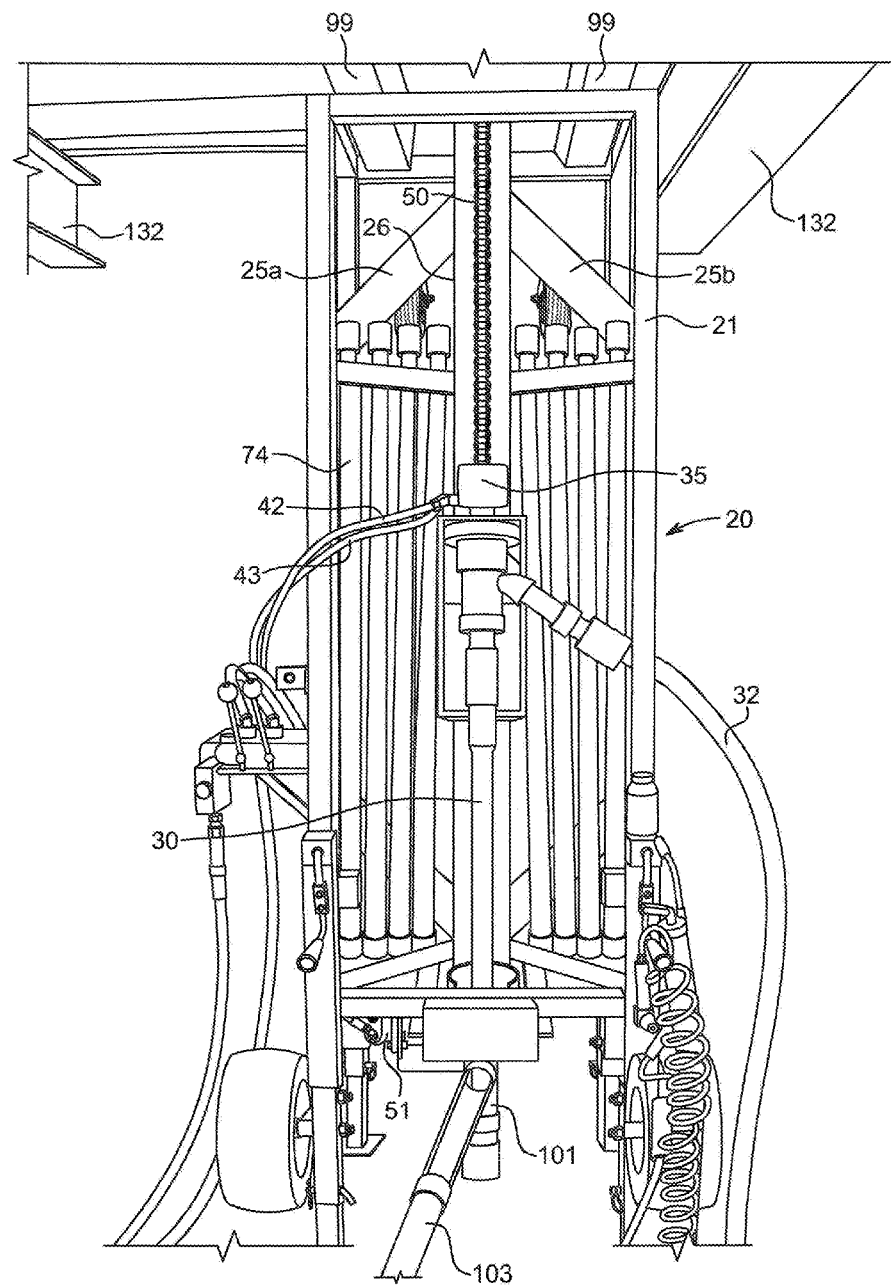
FIG. 5 is a front view of the rig of FIG. 1 during a drilling operation.
Figure 6:
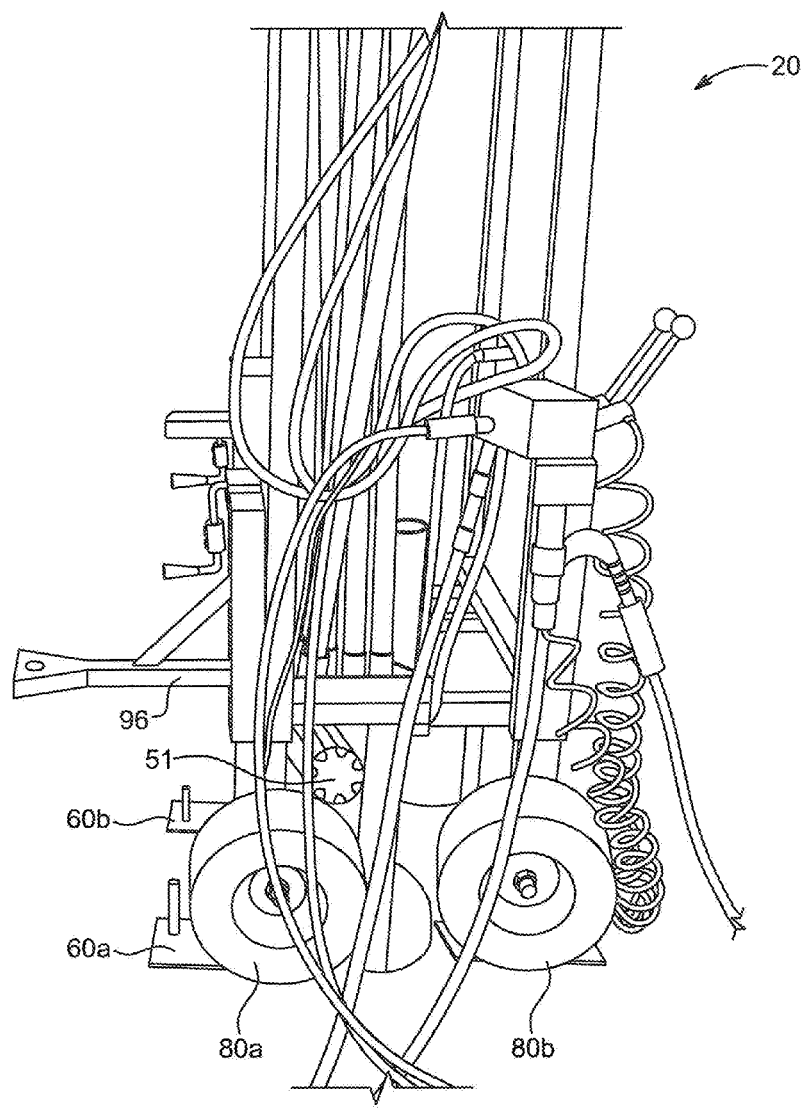
FIG. 6 is a side view of the rig of FIG. 1 attached view a hitch to a pick-up truck.

Bottom wheels 80a-d are best seen in FIGS. 2, 4 and 6. Each of the bottom wheels 80a-d are axially mounted on axle member 84, each of which has an integral axle mounting plate 82 connect to the axle member 84 by axle flange 83. Each of the bottom wheel 80 and axle members 84 are first mounted to adjustable legs 85 that are inserted into the bottom of each the vertical columns 24a-d. The use of the adjustable legs 85 helps to limit the amount of vertical distance travel the hand cranks 68a-d must provide in order accommodate different ceiling heights during a frame wedging operation. Each of the bottom wheels 80a-d are mounted to the outer surface of the legs 83 by means of pairs of bolts 81 passing through axle mounting plates 82. In the embodiments of the drill rig 20 shown in FIGS. 1-7, the wheels are shown mounted on the outside of the rig frame 21. This is the preferred position of the wheels for transport of the rig 20 and for most drilling operations as it provides maximum stability for the drill rig 20. However, the bottom wheels 80a-d can be removed and mounted on the interior surfaces of the legs 85 so that the wheels project inwardly below the rig frame 21. Inward mounting of the wheels 80a-d is sometimes necessary when a particular loop field installation job requires transporting the rig 20 through one or more very narrow areas, such as, a small stairwell or small doorframe, to arrive at the vertical loop for field location in the basement of an existing building. With the bottom wheels 80a-d the mounted in their inward position the width of the rig can reduced as little as two feet. Alternately, the bottom wheels 80a-d may be omitted and a pair of tracks (not shown) can be substituted for the wheels. The tracks may be either powered or unpowered. If powered tracks are utilized, the tracks are preferably actuated by hydraulic motor located adjacent to a track assembly (not shown), which would drive a rotatable axle (not shown) operably connected to the tracks to drive the tracks forward and in a reverse direction in response to manipulation of an additional lever on the hydraulic control assembly 40.

Peripheral wheels 90a-b (See FIGS. 2, 3, 5) extend outwardly from the back surface of the rig frame 21 and are axially mounted within casters 91a, 91b. The casters 91a, 91b are bolted onto the back surface of upper angled braces 25c, 25d. The rig 20 can be tipped back onto its rear pair of bottom wheels 80c, 80d and the peripheral wheels 90a, 90b, which allows the drill rig 20 to be rolled in a supine, rather than upright position. This allows the drill rig 20 to be rolled under low hanging obstacles such as low doorframes, low ceilings, low hanging light fixtures, chandeliers, etc. The drill rig 20 is typically stored or transported in the supine position. The drill rig 20 is typically significantly easier to roll up and down staircases in the supine position than in its upright position. This is because in its supine position the weight of the drill rig 20 is more evenly distributed along the length of the drill rig frame to multiple stairs via multiple contact points between stair surfaces and the wheels. When necessary, the peripheral wheels may also be dismounted to maneuvering the drill rig 20 through very tight spaces in its vertical position and then the wheels can be remounted if necessary.

Referring now to FIG. 5, the drill rig 20 is shown in a drilling position with drill bit 30 extending into temporary borehole casing member 101 which is threaded into permanent, cast-iron vertical borehole casing 100. The vertical borehole casing is about 4 feet long and is temporarily installed prior to the drill rig 20 actively drilling a vertical borehole. The borehole casing member 101 is pushed into the ground under pressure to seal the casing to the dirt for controlled recirculation fluid flow during drilling. The borehole casing member 101 is removed after each borehole is finished and reused again for the next vertical borehole. Temporary borehole casing member 101 includes a mud recirculation output pipe 102 which extends horizontally away from the drill rig 20 and connects to a mud recirculation output pipe 103, although a pipe is preferred and output hose (not shown) may also be used. As shown schematically in FIG. 7, the mud recirculation output pipe 103 empties into the input end 105 of sediment settling box 104, which includes multiple mud settlement and filtering chambers. The sediment settling box 104 is dug into the floor of the basement with its input end 105 higher than the output end 106 so that the recirculation fluid flows by force of gravity from mud recirculation pipe 102 through recirculation output pipe 103 into the input end of the sediment settling box 104 and through to its output end 106. As a recirculation mud passes from the input 105 to the output end 106 of the sediment settling box 104, the large sediment particles and bits of rock carried within the recirculation mud are removed. The purified drilling mud then exits the settlement box 104 via pump input hose 107 which extends to the mud recirculation pump 108. Mud recirculation pump 108 sends the purified drilling mud back to the drill rig 20 through mud recirculation hose 32. The preferred mud recirculation pump 108 is powered by hydraulic pressure with a pump hydraulic input hose 47 and pump hydraulic output hose 48 connected to the hydraulic control assembly 40. Mud recirculation pump 108 is controlled by mud pump lever 49 located on hydraulic control assembly 40. Alternately, the mud recirculation pump 108 can be electrically powered provided that the drilling job site as an accessible electric power supply. One advantage of using the hydraulic pressure to operate the mud recirculation pump 108 is that a single operator can control the mud circulation pump 108, drill motor 35, and drive chain motor 51 all from the hydraulic control assembly 40. One advantage of constructing a vertical loop field within the confines of the building is that the settlement settling box 104 can be installed in a single fixed location within the building for the entire drilling process. This means that as the drill rig 20 is moved between various borehole locations, the recirculation output pipe 103 can be stretched between the new location and the settlement box 104. Typically, prior art outdoor vertical loop fields had borehole locations sufficiently far apart that the prior art settlement box would need to be relocated as each new vertical borehole was drilled for the field.

Due to the rugged conditions likely to be encountered by the drill rig 20, the structural members of the drill rig frame 21 and the mast 26 are constructed of square metal tube stock that is seam welded along its points of contact with the other square tube stock parts. Preferably, the square metal tube stock used for the drill rig frame 21 and mast 26 is 10 gauge steel tube stock. However, other strong, but relatively light weight metals may be used such as aluminum or nickel alloy square tube stock may be substituted for those parts. The footpads, angled braces, upper pipe rack segments 70a-c, pipe rack triangle baseplate, tray side walls are all made from metal plate stock that is seam welded to the adjoining metal parts. The preferred metal plate stock for the used for fabricating the footpads, angled braces, upper pipe rack segments, pipe rack triangle baseplate, pipe tray side walls is 6 gauge steel plate stock. Alternately, other strong, light weight metals may be used such as aluminum alloy plate stock or nickel alloy plate stock may be substituted for those parts.

Figure 7:
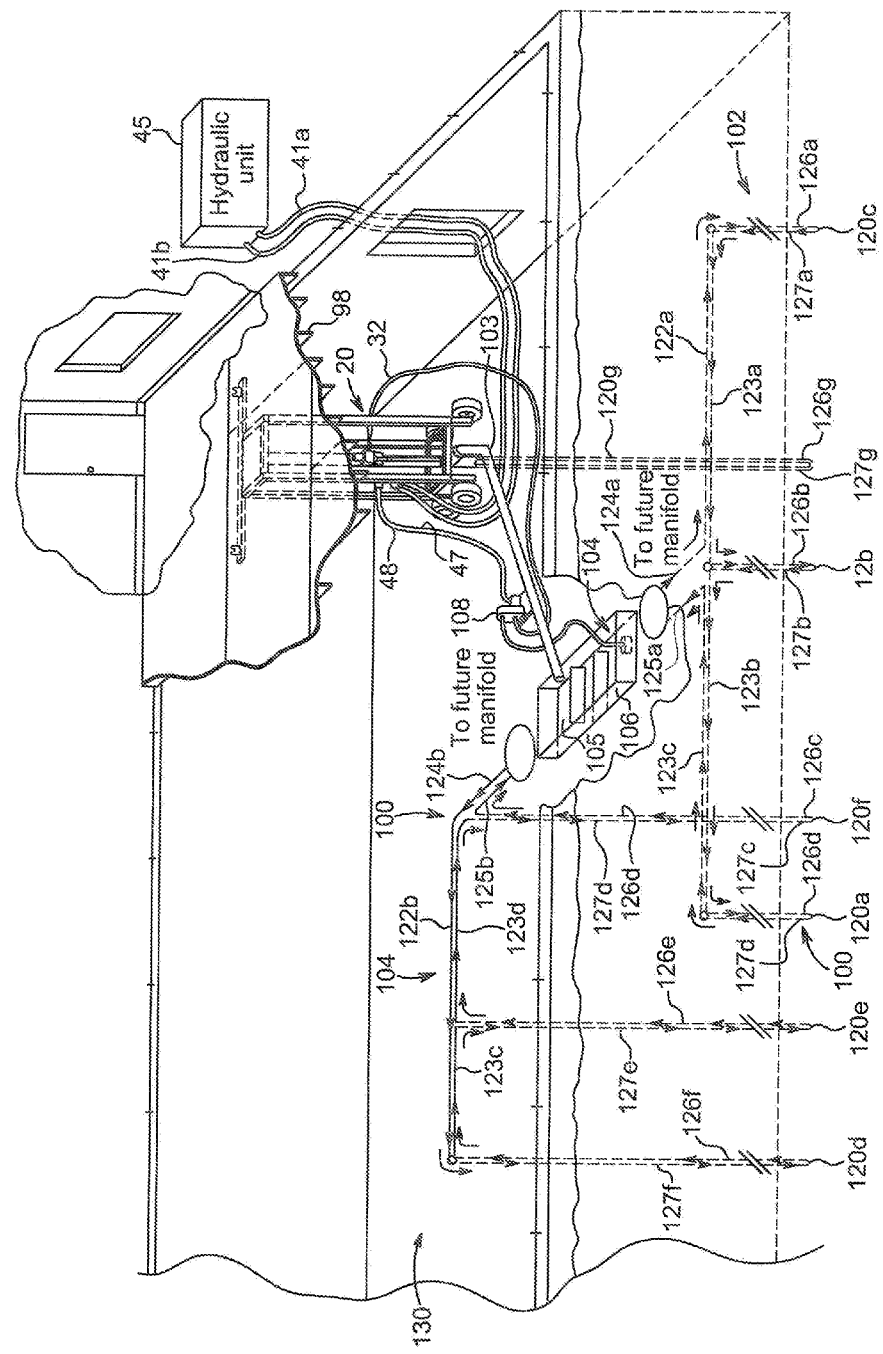
FIG. 7 is a schematic view of a drill rig and an under building, in-series geothermal loop field in accordance with a preferred embodiment of the invention.

FIG. 7 also illustrates a novel highly efficient shallow, serial vertical borehole geothermal loop field 100 in accordance with another embodiment of the invention. By utilizing the compact portable drill rig 20 of the invention, the rig 20 can be entered into the basement (or crawl space) of an existing building or into framed out new construction. This allows for more cost effective installation of energy-saving geothermal heating/cooling systems units. The vertical loop field shown in FIG. 7 is extremely efficient to both install and to operate because the shallow in-series vertical boreholes 120a-f are drilled a depth less than the local depth of the overburden material. In this way, all of the vertical loop field boreholes may be drilled without having to drill through any bed rock. This is advantageous as it is typically far easier and faster to drill vertical boreholes through overburden material than bedrock. This cuts down on the overall drilling time for vertical loop field installation as well as limiting the maintenance required and the wear and tear on the drill rig. In actual operation, the applicant has found the shallow, in series vertical borehole geothermal loop fields in accordance FIG. 7 provide significantly more efficient thermal conducting fluid return temperatures (higher return temps in the winter heating season, lower return temps in the summer cooling season) than the prior art exterior drilled, deep loop fields with the same quantity of lineal feet of vertical borehole. Of course, there are locations where the local overburden depth is insufficient to design an efficient vertical loop field with boreholes drilled entirely above the bedrock. Applicant has found that overburden depth of at least 50 feet are sufficient to design an efficient, in series, above bedrock vertical loop system, and that local overburden depths of between 80 and 150 feet are optimal for shallow depth, in series, vertical loop fields of the invention.

As can be seen in FIG. 7, the vertical boreholes 120a-f of the loop field 100 are arranged into two parallel sets 102, 104 of three serially connect vertical boreholes 120a-c and 120d-f, respectively. A seventh, standalone vertical borehole 120g is shown in FIG. 7 to schematically illustrate the drilling process utilizing drill rig 20. Each of the vertical boreholes in the two sets 102, 104 of in-series boreholes 120a-c and 120d-f are joined to together by series short horizontal pipe runs 123a-d. Each of the two sets 102, 104 includes an output side manifold horizontal pipe segments 124a, 124b, respectively and return side manifold horizontal pipe segments 125a, 125b, respectively, which join each of the two series 102, 104 to the manifold (not shown). Each of the boreholes 120a-g include both descending pipe segments 126a-g and ascending pipe segments 127a-g. The manifold (not shown) in the system 100 is typically installed adjacent to the geothermal heating and air-conditioning unit (not shown). The manifold is linked to the geothermal heating and air-conditioning unit by a short output main (not shown) and a short input main (not shown). In the under building vertical loop field geothermal systems of the invention, the manifold does not need to be buried in the ground. This facilitates the initial purging of the manifold and the loop field 100 and its ongoing maintenance once in operation.

While the two parallel sets (102, 104) times three serially linked vertical borehole configuration is appropriate for the relatively wide and shallow depth dimension buildings such as the one illustrated in FIG. 7, other configurations might be more appropriate for buildings having different geometry. For example, in narrow frontage city lots, the buildings are frequently narrow, long in depth and have multiple levels of living space. In those situations, applicant prefers to use a 5 linked, in series vertical boreholes times 2 parallel sets of boreholes. Optimally, when designing the vertical loop field for a given building, the distance between the furthest peripheral borehole locations within the vertical geothermal loop field are selected to fit within the interior wall foot print of the building. However, when attempting such a fit, the minimum distance between adjacent holes should be at least ten feet. Applicant has found that such under building vertical geothermal loop fields are surprisingly more efficient than geothermal loop fields of similar vertical loop footage and borehole arrangement. Accordingly, whenever possible, the design of the vertical borehole loop field should include shallow depth boreholes joined in series and should be designed to fit entirely within the foot print of the building.

Method of designing and installing an optimal vertical geothermal loop field in accordance with the invention includes the following steps. First, the system designer calculates the number of lineal feet of vertical borehole needed to be drilled to provide a predetermined BTU capacity for the field. This is typically done via a computer program which utilizes rough rules of thumb, such as, requiring 150 vertical feet of loop field for every ton of BTU capacity, the system will require to heat/cool the interior space of the building. Once the vertical borehole depth requirement has been calculated, the system designer must then consider whether shallow depth, in series boreholes can meet the BTU capacity requirement. In this step, the system designer takes in consideration the local overburden depth below the building. If the overburden depth is greater than 50 feet and vertical borehole depth requirement can be accommodated by an acceptable number of shallow depth for holes within the foot print of the building, a shallow depth, in-series loop field design is selected. Whether shallow or deep boreholes are adequate for the system design, the designer then needs to calculate the minimum number of holes for the system by dividing the vertical depth requirement by the depth of the local overburden or by the most economical depth for deep boreholes at the particular location. The system designer then takes the number of required vertical boreholes and arranges them within the building foot print while providing at least 10 feet of spacing between each of adjacent vertical boreholes. Next, the system designer takes in consideration the shape of the building foot print to arrange the vertical boreholes in the appropriate number of in vertical loops joined into series as well as the number of parallel sets of the in-series vertical loops.

During the vertical loop field design process, if the overburden is too shallow or if the building is so large that the vertical depth requirement cannot be met by the quantity of shallow depth vertical boreholes that will fit within the building foot print, then deep vertical depth boreholes on the order of 150 feet to 600 feet may be required to meet the heating/cooling needs of the building. Once the vertical loop field has been designed, each of the calculated number of boreholes is drilled. If the maximum number of 600 feet deep boreholes that can fit with in a building for print is insufficient to meet the vertical depth requirement for the building, additional boreholes can be drilled outside of the building foot print and linked back to the under building vertical loop field. However, whenever possible this is to be avoided, as applicant has found that under building vertical loop fields are easier to install, maintain, and are more efficient in operation than out-of-doors vertical loop fields.

The descending and ascending pipe segments are installed into each of the vertical boreholes. Output side and return side horizontal pipes are joined to the ascending pipe segments and descending pipe segments of each of the first in-series borehole called for by the system design. Horizontal pipe connecting segments between the ascending pipe segment of an in-series borehole and the descending segment of the next borehole in an in-series set to join them into a series. Horizontal return pipe segments are installed between the last ascending pipe segment of a set of in-series boreholes. Each of the in-series vertical borehole set is connected to a manifold by a set output horizontal pipe which connects to the first descending vertical pipe for each set and by a set return horizontal pipe which connects the last ascending vertical pipe in the series to the manifold. Main output and return horizontal pipe segments are connected to a manifold which are connected to the output side and return side of the geothermal heating/air-conditioning, respectively.

The loop fields of the invention preferably include an interior mounted, above ground manifold. This makes the manifold accessible to the loop field system installer, as well as system maintenance and service personnel after installation, which greatly eases the process of purging air bubbles and impurities from the coolant recirculation system at startup and allows for easier periodic system maintenance thereafter.

Figure 8:
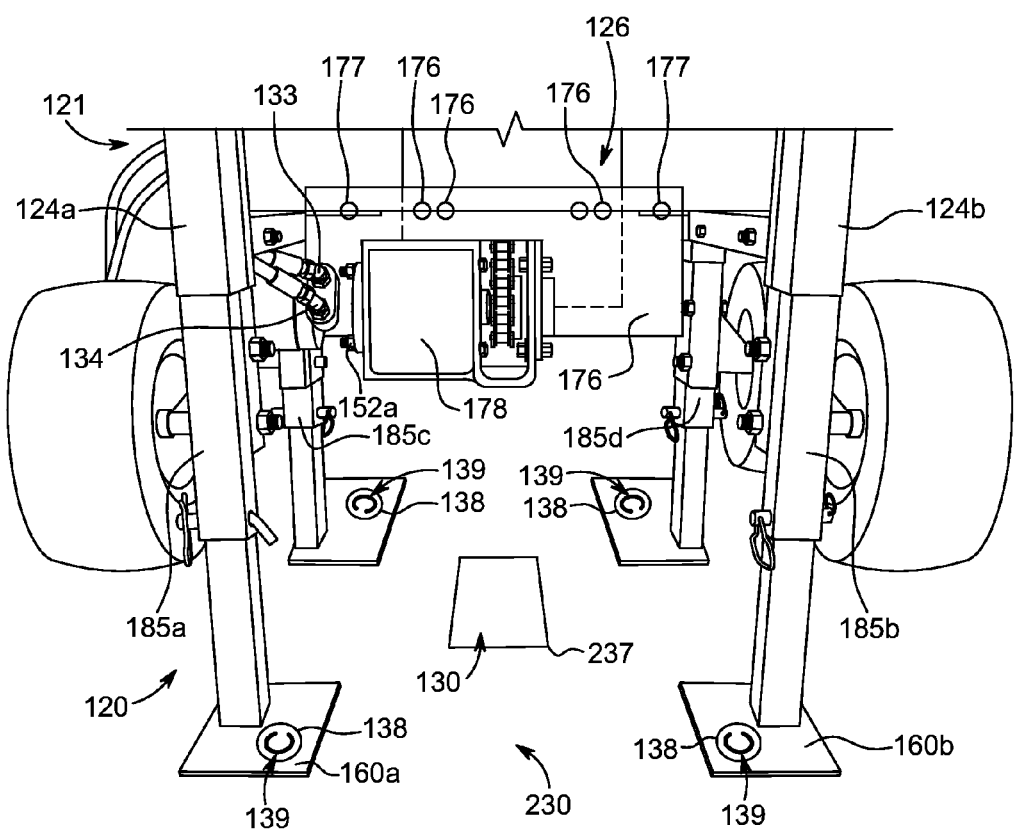
FIG. 8 is a schematic view of another embodiment of the drill rig of the invention which includes a detachable mast and torque hub.

As best seen in FIG. 8, another embodiment of the drill rig is shown in which the central mast portion 126 of the drill rig 120 is detachable by removing a plurality of mast retaining bolts 177 that run through the mounting plate 176 near the base of the drill rig. Optionally, the top of rig 120 may include a second mounting plate (not shown) to secure the upper portion of the mast 126 to the upper portion of the frame 121. This detachment feature allows the drill rig 120 which frequently ways about in excess of 700 to be disassembled into a detachable mast unit weighing approximately 350 pounds and a frame unit which weighs approximately 350 pounds. The detachment feature greatly eases the process of transporting the drill rig into tight spaces such as down stairwells and/or through the window wells or other small openings in a basement or subbasement of a building. Another reason to have detachable mast units is so that different mast units can be substituted into a rig to optimize rig performance for different loop field ground conditions. As described below, a torque hub 178 can be utilized for more efficient drilling of hard bedrock or particularly dense or challenging overburden material. In this vein, FIG. 8 shows a torque hub 178 that is permanently mounted to a detachable mast 126 by welding it to a mounting plate 176. Other detachable mast units may have different torque hubs or lacking any torque hub (as in the embodiments of FIGS. 1-6) so that substituting detachable mast units is one way to can optimize the torque capabilities of the drill rig for the current conditions.

Applicant has found that, for certain types of bedrock drilling operations, (e.g., drilling through granite bedrock), increased drilling power at the drill bit can make the field loop boring process more efficient. Applicant has found that utilizing the torque hub 178 which is fed pressurized hydraulic fluid by hydraulic power supply line 133 and 134 can provide additional drilling power at the drill bit to make bedrock drilling operations more efficient. The torque converter acts to multiply the torque available to the drill bit for such operations. As discussed above, the torque converter can be detached from the drilling rig 120 for drilling operations which do not require high torque, such as, drilling through overburden or soft bed rock. For such soft material loop field drilling, the torque converter 178 and mast 126 can be removed from the rig because it slows the progress of the drill bit through softer materials.

In certain buildings, the floor on the lowest level adjacent to the ground will already have an installed floor, which is typically a poured concrete slab 230 as shown in FIG. 8. Early pouring of the concrete slab is often done in the construction of large commercial building that utilize post tension concrete slab technology to bolster the strength of the building foundation. In situations where a concrete floor exists in the lowest floor of a building, it is still possible to use the drill rig of the invention to install the loop fields of the invention. After a loop field is designed and the borehole locations have been selected and marked unto the concrete slab 230, twelve inch by twelve inch holes 237 are cut into the concrete slab 230 at the location marked for the drilling of each of the boreholes of the loop field. Then, elongated horizontal channels (not shown) are cut through the slab to accommodate the horizontal pipe run linking the boreholes of each serial, multiple borehole loop. One option for creating the optimal down force necessary for drilling (four thousand pounds for the typical four inch drill bit) is to bolt the drill rig to the concrete slab. This can be done by drilling four holes into the concrete slab at each borehole location and placing expandable concrete anchor bolts into each of the holes drilled into the slab. Next, apertures in each of the footpads of the drill rig are lined up with the bolts extending from the slab and the footpads are lowered until they reach the ground and each of the bolts extends through the apertures. Then, a washer 238 is placed over the footpad and the nuts 239 are tightened to secure the rig to the anchor bolts. Upon tightening, the anchor bolts expand within each of the holes drilled into the concrete. Alternately, other fasteners such as concrete tapping screws can be tightened down to provide a down force onto the upper surface of the footpads and thereby provide the necessary down force to the drill bit of the rig.

If the concrete slab has yet to be poured for the floor of the lowest level of a building, each of the borehole locations can be boxed out to create the twelve inch by twelve inch voids in the slab that necessary for drilling of each of the borehole for the loop field. Further, horizontal pipe run to connect the serial boreholes, the loop field to the manifold, and the manifold to the geothermal heating/cooling unit can be preinstalled below ground level prior to pouring of the cement. By these steps, the geothermal installer can avoid having to cut into the concrete slab after it is poured. Then, the borehole filed installer has the choice of whether to utilize anchor bolts or concrete tap screws driven into the concrete slab, the weight of the pipe segments held in the pipe rack, and/or the wedging of the light weight frame of the drill rig into the framing of the building to provide the necessary drill down force. It is contemplated that the borehole field installer may opt to utilize one, two or all three of these selectively activated down force generating systems depending on the situation confronting the installer in the building.

Other embodiments, combinations and modifications of this invention will occur readily to those of ordinary skill in the art in view of these teachings. Therefore, this invention is to be limited only by the following claims, which include all such embodiment methods, and modifications when viewed in conjunction with the above specification and accompanying drawings.

What is claimed:

1. A lightweight, portable drill rig for use in constructing a geothermal loop field within an existing building comprising:
   a lightweight frame;
   a drilling member attached to the lightweight frame for drilling boreholes for the geothermal loop field;
   a remote power source located apart from the drilling member and operably coupled to the drill member to rotate the drill member; and,
   a selectively activated down force member operably coupled to the lightweight frame, whereby, when activated, the selectively activated down force member provides a significant increase in drill rig down force available to the drilling member to cause efficient penetration of the drilling member into the ground during a drilling operation of the geothermal loop field and whereby, when deactivated, the selectively activated down force member significantly decreases the down force on the drilling rig to the extent that the drill rig may be efficiently transported into an existing building and transported between a number of drilling positions within the existing building;
   the selectively activated down force member including a plurality of extendable foot pads which, when activated, are caused to descend downward into contact with the ground thereby lifting the upper portion of the lightweight frame into engagement with a portion of the framing of the building located above the lightweight portable drill rig, and when deactivated, the foot pads are retracted until the foot pads break contact with the ground thereby lowering the frame and breaking contact between the lightweight frame and the portion of the building framing above the drill rig.

2. The lightweight, portable drill rig of claim 1 wherein each of the plurality of foot pads is mounted to one of a plurality of movable legs; each of the plurality of movable legs is slidably, telescopically mounted within one of a plurality of foot pad frames connected to the lightweight frame; each of the plurality of movable legs is operable coupled to one of a plurality of hand cranks; and, each of the plurality of hand cranks is operably connected to a gear assembly mounted on one or the plurality of foot pad frames; whereby rotation of each of plurality of hand cranks in a first direction causes each of the plurality of legs and each of the plurality of footpads to descend toward the ground and rotation of each of the plurality of hand cranks in a second direction causes each of the plurality of legs and each of the plurality of food pads to ascend toward the lightweight frame.

3. A lightweight, portable drill rig for use in constructing a geothermal loop field within an existing building comprising:
- a lightweight frame;
- a drilling member attached to the lightweight frame for drilling boreholes for the geothermal loop field;
- a remote power source located apart from the drilling member and operably coupled to the drill member to rotate the drill member; and,
- a selectively activated down force member operably coupled to the lightweight frame, whereby, when activated, the selectively activated down force member provides a significant increase in drill rig down force available to the drilling member to cause efficient penetration of the drilling member into the ground during a drilling operation of the geothermal loop field and whereby, when deactivated, the selectively activated down force member significantly decreases the down force on the drilling rig to the extent that the drill rig may be efficiently transported into an existing building and transported between a number of drilling positions within the existing building;

the selectively activated down force member including a pipe rack located on the lightweight frame for holding a plurality of field loop drill pipe segments with the selectively activated down force member being selectively activated by placing a sufficient number of field loop piping segments on the rack located on the lightweight frame to provide the necessary down force to the drilling member for a given field loop boring job.

4. The lightweight, portable drill rig of claim 3 wherein the selectively activated down force member is selectively deactivated by removing a sufficient number of field loop drill pipe segments from the pipe rack to substantially reduce the down force on the drill rig for efficient transport of the drill rig between drilling locations.

5. A lightweight, portable drill rig for use in constructing a geothermal loop field within an existing building comprising:
- a lightweight frame;
- a drilling member attached to the lightweight frame for drilling boreholes for the geothermal loop field;
- a remote power source located apart from the drilling member and operably coupled to the drill member to rotate the drill member; and,
- a selectively activated down force member operably coupled to the lightweight frame, whereby, when activated, the selectively activated down force member provides a significant increase in drill rig down force available to the drilling member to cause efficient penetration of the drilling member into the ground during a drilling operation of the geothermal loop field and whereby, when deactivated, the selectively activated down force member significantly decreases the down force on the drilling rig to the extent that the drill rig may be efficiently transported into an existing building and transported between a number of drilling positions within the existing building;

the lightweight frame including at least two wheels which are located on at least one end of the frame and spaced apart less than about four feet, thereby allowing a substantial portion of the weight of the drill rig to be supported by the at least two wheels so that at least the frame portion of the rig may be wheeled up and down a standard sized staircase into the basement of a building for drilling therein and for removal after drilling the loop field by the same route.

6. A lightweight, portable drill rig for use in constructing a geothermal loop field within an existing building comprising:
- a lightweight frame;
- a drilling member attached to the lightweight frame for drilling boreholes for the geothermal loop field;
- a remote power source located apart from the drilling member and operably coupled to the drill member to rotate the drill member;
- a selectively activated down force member operably coupled to the lightweight frame, whereby, when activated, the selectively activated down force member provides a significant increase in drill rig down force available to the drilling member to cause efficient penetration of the drilling member into the ground during a drilling operation of the geothermal loop field and whereby, when deactivated, the selectively activated down force member significantly decreases the down force on the drilling rig to the extent that the drill rig may be efficiently transported into an existing building and transported between a number of drilling positions within the existing building; and,
- whereby the drill rig of the invention weighs less than 800 pounds and the lightweight frame has a height of less than about 7 feet, width of less than about four feet, and a depth of less than about four feet thereby allowing it to be transferred through escape window wells into the interior of an existing building.

7. The lightweight, portable drill rig of claim 6 wherein the drilling member is operable connected to a mast unit having a drive assembly for lowering and raising the drilling member and wherein the mast unit includes a detachable mounting member for mounting the mast to the lightweight drill rig prior to a drilling operation and for removing the mast unit from the lightweight frame when transporting the lightweight drill rig into or out of the building.

8. The lightweight, portable drill rig of claim 6 wherein the drill rig further comprises a detachable torque converter unit in fluid communication with the hydraulic power supply line to selectively multiply the maximum torque available to the drill bit for drilling through hard bedrock to form the boreholes of a geothermal loop field.

9. A lightweight, portable drill rig for use for drilling geothermal loop field boreholes underneath an existing building into which a geothermal heating/air conditioning unit is being installed, the portable drill rig comprising:
- a lightweight frame;
- a drilling member attached to the frame for drilling boreholes for the geothermal loop field;
- a hydraulic pressure motor located outside of the existing building; and,
- a hydraulic fluid conduit in fluid communication with the hydraulic pressure motor to deliver pressurized hydraulic fluid to the drill member located within the building to drive rotation of the drill member;

a first end of the bottom portion of the lightweight frame including at least one pair of spaced apart bottom wheels and at least one pair of selectively descending footpads, which selectively descending foot pads can be extended downwardly into contact with the ground prior to initiation of the drilling operation thereby causing the upper portion of the lightweight frame to operably engage a portion of the framing of the building located above the drill rig to provide down force to the drill bit.

10. The lightweight portable drill rig of claim 9 wherein the hydraulic pressure motor is a small internal combustion engine which is located out-of-doors so that exhaust fumes are vented away from the enclosed space in the building in which the drill rig is operating.

11. The lightweight portable drill rig of claim 9 wherein the second end of the bottom portion of the lightweight frame includes a second pair of wheels and a second pair of selectively descending footpads extending from the bottom portion of the frame, which second pair of selectively descending foot pads can be extended downwardly into contact with the ground prior to initiation of the drilling operation thereby causing the upper portion of the lightweight frame to operably engage the framing of the building located above the drill rig to provide down force to the drill bit.

12. The lightweight portable drill rig of claim 9 wherein the frame is equipped with a pair of peripheral wheels, which extend outwardly from upper portion of the lightweight frame at its first end to allow the lightweight frame to be rolled on the at least one pair of bottom wheels and the pair of peripheral wheels when the lightweight frame is tipped from a substantially vertical, drilling orientation, to a substantially horizontal, low clearance orientation whereby the lightweight portable drill rig can be rolled in the substantially horizontal, low clearance orientation through low clearance door frames and up and down low clearance staircases to facilitate movement of the lightweight drill rig into and out of an existing building.

13. The lightweight portable drill rig of claim 12 wherein at least two of the plurality of the footpads further includes at least one aperture for receipt of one or more anti-rotation stake members that can be driven into the ground to prevent rotation and/or excessive movement of the lightweight frame during the loop field drilling operation at a given location.

14. A lightweight, portable drill rig for use in constructing a geothermal loop field within an existing building comprising:
- a lightweight frame;
- a drilling member for drilling boreholes for the geothermal loop field;
- a remote power source located apart from the drilling member and operably coupled to the drill member to rotate the drill member; and,
- a selectively activated down force member operably coupled to the drilling member, whereby, when activated, the selectively activated down force member provides a significant increase in drill rig down force available to the drilling member to cause efficient penetration of the drilling member into the ground during a drilling operation of the geothermal loop field and whereby, when deactivated, the selectively activated down force member significantly decreases the down force on the drilling rig to the extent that the drill rig may be efficiently transported into an existing building and transported between a number of drilling positions within the existing building;
- the selectively activated down force member including a building framing engagement member operably linked to the lightweight frame which is caused to firmly engage a portion of the framing of the building located above the lightweight portable drill rig when activated, and when deactivated, the building framing engagement member breaks the engagement with the portion of the building framing above the drill rig to allow for efficient transport of the drill rig.

* * * * *